(12) United States Patent
Tankov et al.

(10) Patent No.: US 7,509,429 B2
(45) Date of Patent: Mar. 24, 2009

(54) MESSAGE ENDPOINT ACTIVATION

(75) Inventors: Nikolai D. Tankov, Sofia (BG); Violeta G. Georgieva, Sofia (BG); Svilen M. Dikov, Sofia (BG)

(73) Assignee: SAP AG, Walldorf (DE)

( * ) Notice: Subject to any disclaimer, the term of this patent is extended or adjusted under 35 U.S.C. 154(b) by 924 days.

(21) Appl. No.: 10/856,249

(22) Filed: May 28, 2004

(65) Prior Publication Data

US 2005/0278452 A1 Dec. 15, 2005

(51) Int. Cl.
G06F 15/16 (2006.01)
G06F 15/177 (2006.01)
G06F 13/00 (2006.01)

(52) U.S. Cl. ............... 709/228; 709/220; 709/227; 719/331; 719/311

(58) Field of Classification Search ........... 709/206, 709/230, 228, 220, 227; 719/331, 311
See application file for complete search history.

(56) References Cited

U.S. PATENT DOCUMENTS

| | | | |
|---|---|---|---|
| 5,613,114 A | 3/1997 | Anderson et al. | |
| 5,790,789 A | 8/1998 | Suarez | |
| 6,003,061 A | 12/1999 | Jones et al. | |
| 6,125,382 A | 9/2000 | Brobst et al. | |
| 6,233,585 B1 | 5/2001 | Gupta et al. | |
| 6,260,057 B1 | 7/2001 | Eykholt et al. | |
| 6,411,983 B1 | 6/2002 | Gallop | |
| 6,519,605 B1 | 2/2003 | Gilgen et al. | |
| 6,691,304 B1 | 2/2004 | Zhang et al. | |
| 6,721,777 B1 * | 4/2004 | Sharma | 718/101 |
| 6,766,349 B1 | 7/2004 | Belkin | |
| 6,778,990 B2 | 8/2004 | Garcia et al. | |
| 6,832,238 B1 | 12/2004 | Sharma et al. | |
| 6,886,041 B2 * | 4/2005 | Messinger et al. | 709/226 |
| 6,976,061 B1 | 12/2005 | Sharma | |
| 7,007,075 B1 | 2/2006 | Coffey | |
| 7,036,110 B2 * | 4/2006 | Jeyaraman | 717/120 |
| 7,036,124 B1 * | 4/2006 | Patterson | 718/104 |
| 7,080,119 B2 * | 7/2006 | Felt et al. | 709/203 |
| 7,089,317 B2 * | 8/2006 | Jeyaraman et al. | 709/230 |
| 7,089,584 B1 | 8/2006 | Sharma | |
| 2002/0046230 A1 | 4/2002 | Dieterich et al. | |
| 2002/0107872 A1 | 8/2002 | Hudis et al. | |
| 2002/0144002 A1 | 10/2002 | Matena et al. | |
| 2003/0023599 A1 | 1/2003 | Garcia et al. | |

(Continued)

OTHER PUBLICATIONS

"OA Mailed Apr. 15, 2008 for U.S. Appl. No. 10/860,839", (Apr. 15, 2008), Whole Document.

(Continued)

*Primary Examiner*—Kevin Bates
(74) *Attorney, Agent, or Firm*—Blakely Sokolof Taylor & Zafman

(57) ABSTRACT

Systems and methods for message endpoint activation are disclosed. Under an embodiment of the invention, a method includes identifying an active resource adapter for a server; identifying a message listener type that is supported by the active computer resource adapter; establishing a message subscription to provide messages from a message provider to a server component, a subscription request from the server component comprising the active resource adapter and the supported message listener type; and transferring messages from the message provider to a message listener component for the server component utilizing the active resource adapter.

33 Claims, 5 Drawing Sheets

U.S. PATENT DOCUMENTS

| | | | |
|---|---|---|---|
| 2003/0074217 A1* | 4/2003 | Beisiegel et al. ............... 705/1 |
| 2003/0093402 A1* | 5/2003 | Upton ........................... 707/1 |
| 2003/0145074 A1* | 7/2003 | Penick ...................... 709/223 |
| 2003/0182426 A1* | 9/2003 | Hapner et al. ............... 709/226 |
| 2003/0191803 A1 | 10/2003 | Chinnici et al. |
| 2003/0229888 A1 | 12/2003 | Spotswood et al. |
| 2003/0236923 A1 | 12/2003 | Jeyaraman et al. |
| 2004/0015859 A1 | 1/2004 | Potter et al. |
| 2004/0015974 A1* | 1/2004 | Jeyaraman .................. 718/104 |
| 2004/0078495 A1* | 4/2004 | Mousseau et al. ............... 710/1 |
| 2004/0098726 A1* | 5/2004 | Currie et al. ................ 719/310 |
| 2004/0109413 A1 | 6/2004 | Hierholzer et al. |
| 2004/0172639 A1 | 9/2004 | Lou et al. |
| 2004/0215473 A1 | 10/2004 | Bhogi et al. |
| 2004/0244004 A1 | 12/2004 | Pardon et al. |
| 2005/0060169 A1 | 3/2005 | Gangadharan et al. |
| 2005/0240663 A1 | 10/2005 | Wolber et al. |
| 2006/0041662 A1 | 2/2006 | Georgiev et al. |
| 2006/0075115 A1* | 4/2006 | Chitilian et al. ............. 709/227 |

OTHER PUBLICATIONS

"Final Office Action Mailed Apr. 4, 2008 for U.S. Appl. No. 10/858,661", (Apr. 4, 2008), Whole Document.

"OA mailed Sep. 13, 2007 for U.S. Appl. No. 10/858,661".

"OA Mailed Dec. 28, 2007 for U.S. Appl. No. 10/861,267", (Dec. 28, 2007), Whole Document.

"OA mailed Dec. 14, 2007 for U.S. Appl. No. 10/863,159".

Demichiel, Linda, et al., "JSR 220: Enterprise JavaBeansTM,Version 3.0, EJB Core Contracts and Requirements", *Sun Microsystems, EJB 3.0 Expert Group*, (May 2, 2006), Whole Document.

Demichiel, Linda, et al., "JSR 220: Enterprise JavaBeansTM,Version 3.0, Java Persistence API", *Sun Microsystems, EJB 3.0 Expert Group*, (May 2, 2006), Whole Document.

Shannon, Bill, "JavaÅ 2 Platform. Enterprise Edition Specification, v1.4", *Sun Microsystems*, (Nov. 24, 2003), Whole Document.

USPTO, "OA Mailed Apr. 15, 2008 for U.S. Appl. No. 10/860,839", (Apr. 15, 2008), Whole Document.

USPTO, "OA Mailed Sep. 3, 2008 for U.S. Appl. No. 10/858,657", (Sep. 3, 2008), Whole Document.

USPTO, "FOA Mailed Jul. 9, 2008 for U.S. Appl. No. 10/861,267", (Jul. 9, 2008), Whole Document.

"FOA Mailed Oct. 27, 2008 for U.S. Appl. No. 10/860,839", (Oct. 27, 2008), Whole Document.

* cited by examiner

MESSAGE ENDPOINT ACTIVATION

TECHNICAL FIELD

Embodiments of the invention generally relate to the field of client/server systems and, more particularly, to a system and method for message endpoint activation.

BACKGROUND

A conventional client/server system may receive data from multiple internal and external sources and may provide various methods for receiving such data. For example, software applications or program objects may be implemented to act as listening devices or message endpoints. A server may establish a resource adapter for the purpose of receiving messages from a particular enterprise information system (EIS), with messages from the EIS being transferred through the resource adapter and then being directed to the appropriate listening devices.

A conventional client/server system may impose limitations on the types of application or objects that can act as listening devices for a server. For example, in a J2EE environment, a message endpoint for asynchronous receipt of messages is limited to a message-driven enterprise Java bean (MDB). Other types of components cannot be utilized to consume such messages.

In addition, a conventional client/server system may be inefficient in the establishment of a messaging subscription. Such a process requires that certain choices be made because, for example, a system component is likely only compatible with certain message types, a resource adapter is not generally compatible with all message providers, and a resource adapter will only support certain message types. Further, when a message subscription is activated, certain compatible resource adapters may potentially already be in place during the negotiation of the subscription, but such existing adapters will not be utilized if their existence is not discovered. Similarly, the deactivation of resources will not be efficient if the message endpoints and resource adapters are not sufficiently identified in the process.

SUMMARY OF THE INVENTION

A system and method for message endpoint activation is described.

Under one embodiment of the invention, a method comprising identifying an active resource adapter for a server; identifying a message listener type that is supported by the active computer resource adapter; establishing a message subscription to provide messages from a message provider to a server component, a subscription request from the server component comprising the active resource adapter and the supported message listener type; and transferring messages from the message provider to a message listener component for the server component utilizing the active resource adapter.

Under another embodiment of the invention, a server comprises a server component, the server component to request a subscription to receive messages from a message provider, the subscription request including a desired active resource adapter and a desired message type; and an activation interface, the activation interface to receive the request from the server component, the activation interface to send an activation call to the resource adapter; the resource adapter to transfer messages from the message provider to a message listener component of the desired message type.

Under another embodiment of the invention, a server comprises means for identifying an active resource adapter for the server; means for identifying message types supported by an active resource adapter; and means for establishment of a message subscription between a server component and a message provider, wherein the means includes establishment of a message endpoint that does not comprise a message-driven Java bean.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
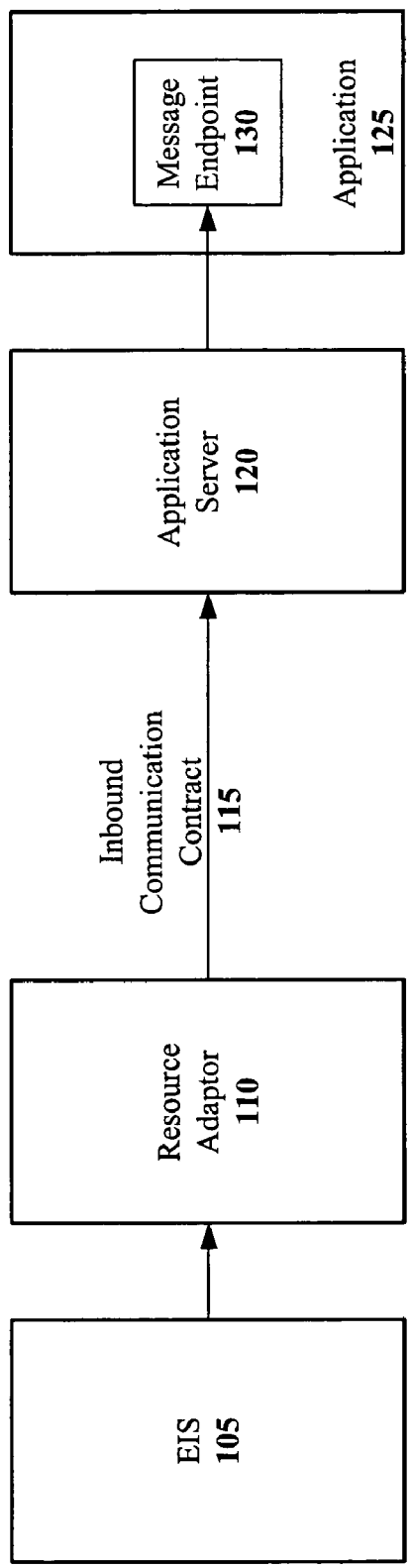
FIG. 1 is a block diagram of an embodiment of message inflow in a client server system.

Embodiments of the invention are generally directed to a system and method for message endpoint activation.

Under an embodiment of the invention, a server component or application may register as a recipient of messages from a resource, even though the component is of an arbitrary type. For example, a component may register as a message endpoint to receive messages from an enterprise information system (EIS) even though the application does not comprise a message-driven Java bean (MDB).

Under an embodiment of the invention, a common interface is established for registration of message recipients in a Java environment. Under an embodiment, the common interface allows the registration of a component that does not comprise a message-driven Java bean.

Under an embodiment of the invention, a server component establishes a message subscription in a single pass, utilizing a single activation request. Under an embodiment of the invention, a process for establishment of a message subscription includes passing sufficient parameters in an activation request to allow establishment of the subscription without further data.

Under an embodiment of the invention, a server component sends a message subscription activation or deactivation request to an activation interface. The activation interface is a component that is implemented to control and monitor activations as a part of a connector service for the server. In the activation of a message subscription, a process may include the passing of certain parameters to the activation interface. The activation parameters may include the name of an active resource adapter for the message subscription. The activation parameters may include a message listener type for the message subscription. The activation parameters include an instance of an endpoint factory to create message endpoints for the message subscription.

A message endpoint is a program component residing in an application server to asynchronously consume message from a message provider. Under an embodiment of the invention, an application server comprises a J2EE (Java 2 Platform, Enterprise Edition), as provided in the J2EE specification, version 1.4, Nov. 24, 2003. In such environment, the J2EE Connector Architecture Specification, version 1.5, Nov. 24, 2003 (J2EE CAS) limits message endpoints to a message-driven Java bean (MDB). (In addition, a messaging-style API, such as Java messaging service (JMS) may be utilized to send and synchronously receive messages.) Under an embodiment of the invention, a server utilizing the J2EE architecture may allow implementation of a message endpoint that does not comprise a message-driven Java bean, and thus does not require a compatible Java bean container.

In general terms, a Java Bean is a Java software component. An enterprise Java bean (EJB) is a Java bean that implements a business task or business entity and that resides in an EJB container. A container is a program entity that provides life cycle management, security, deployment, and runtime services to Java components. Enterprise Java Beans are described in the Enterprise Java Bean Specification 2.1 (Nov. 24, 2003). An EJB may be either an entity bean (which generally represent persistent data in a database), a session bean (which are created by a client and that generally exist for a single client-server session), or a message-driven bean.

A message-driven bean (or MDB) is an asynchronous message consumer. A message-driven bean is invoked by a container as a result of the arrival of a message at the destination or endpoint that is serviced by the message-driven bean. Therefore, a client accesses a message-driven bean by sending messages to the destination or endpoint for which the message-driven Java bean is an active listener. The message-driven bean, as a message consumer, handles the processing of the messages. From the perspective of the client, the message-driven bean is hidden behind the destination or endpoint for which the message-driven bean is the message listener, with the actual locations of an enterprise bean and EJB container generally being transparent to a client using the enterprise bean.

To establish a messaging subscription in a server, a resource adapter is utilized to provide an interface between the server and a message provider. A resource adapter is a system component located in an application server's address space that provides connectivity for message providers and that is capable of delivering messages to message endpoints residing in the application server. A resource adapter is thus used to plug an external message provider into an application server. Each resource adapter then supports certain endpoint message listener types.

A message provider to a server may comprise an enterprise information system (EIS). An EIS provides the information infrastructure for an enterprise. Under an embodiment of the invention, an EIS acts as a message provider to a server, with the messages being consumed by a message endpoint, the message endpoint being of an arbitrary type that is not limited to a message-driven Java bean.

Under an embodiment of the invention, methods are implemented that allow a component to obtain information regarding the identity of resource adapters and listener types that will enable the establishment of a message subscription. A first method may provide for identifying all running resource adapters on a server. A second method may provide for listing all supported message listener types for a resource adapter. The methods allow a server component to identify and choose the best resource adapter and message listener type for a message subscription, such as in circumstances in which a server component is compatible with multiple message types.

FIG. 1 is a block diagram of an embodiment of message inflow in a client server system. In this illustration, an enterprise information system (EIS) provides communications to a server system. The EIS 105 utilizes a resource adapter 110 to interface with the server system. In this example, the parameters of the inbound communication are subject to an inbound communication contract 115. The inbound communication is transferred to an application server 120 and on to a particular application 125. The inbound communication then is consumed by a message endpoint 130, which is a program component utilized to receive message. The type of the message endpoint 130 is supported by the resource adapter, thereby enabling the communications process. Under an embodiment of the invention, the message subscription arrangement that is illustrated in FIG. 1 is established by a versatile activation interface that allows use of various message endpoints. In such embodiment, the message endpoint 130 is an arbitrary type of listening program component.

FIG. 1 illustrates a simplified process in which a single EIS provides inbound-only communications with a server system. A server system may receive messages from multiple EIS systems and other message providers, and the communications may be outbound or bi-directional as well. Multiple resource adapters may be active at any time, with multiple possible message endpoints being in place to operate with the active resource adapters.

Figure 2:
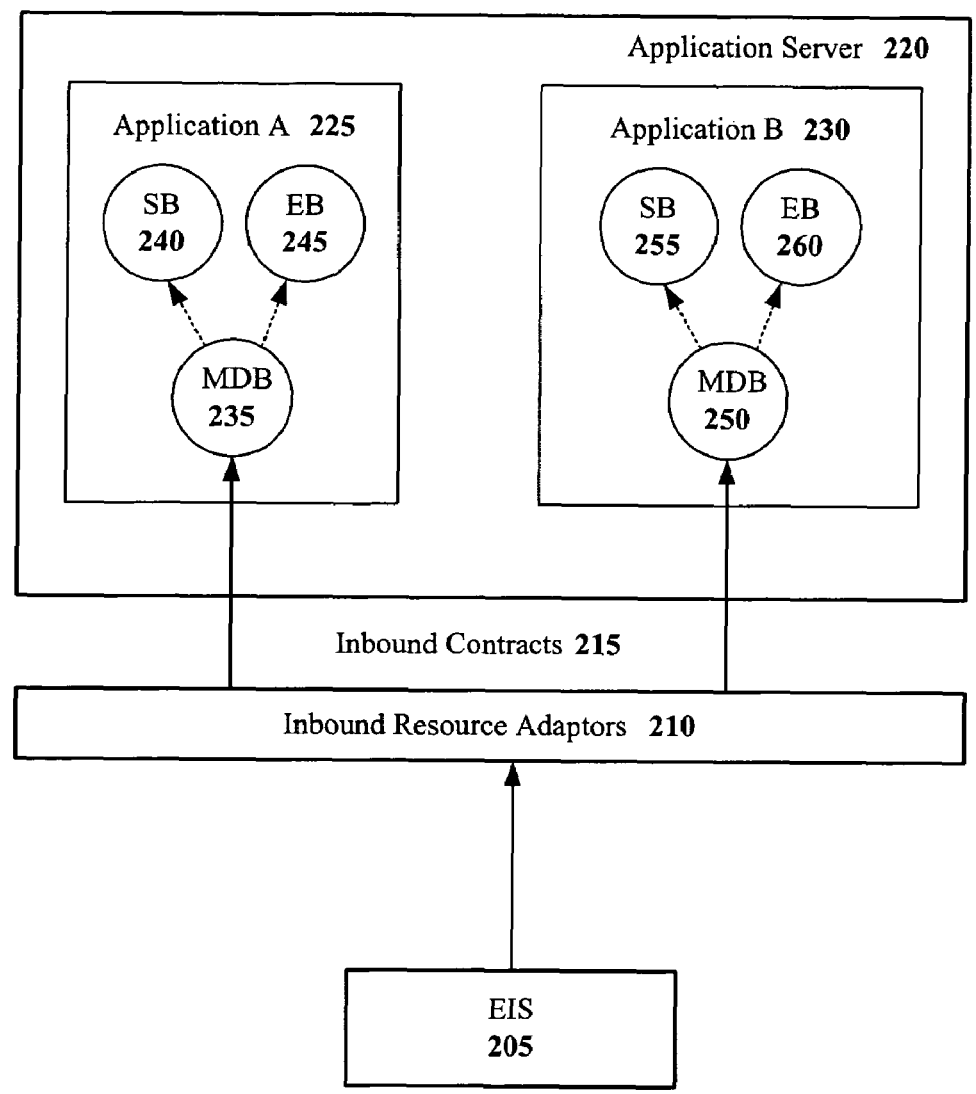
FIG. 2 is a block diagram of an embodiment of a client/server system receiving messages.

FIG. 2 is a block diagram of an embodiment of a client/server system receiving messages from an external source. In this illustration, an EIS 205 sends messages to a server. The message is received by inbound resource adapters 210, at least one of which is configured for the EIS 205. The inbound communications are transferred pursuant to inbound contracts 215 and may be received by multiple listeners in an application server 220.

FIG. 2, the application server 220 includes a first application denoted as application A 225 and a second application denoted as application B 230. As previously stated regarding the JCA specification, the message endpoints receiving asynchronous messaging are limited to message-driven Java beans (MDB), shown as a first MDB 235 for an application A 225 and a second MDB 250 for an application 230. In this illustration the message listeners then transfer data to other components as needed for processing and utilization of the received messages, with the components being shown in FIG. 2 as a first session bean (SB) 240 and a first entity bean (EB) 245 receiving data from the first MDB 235 and as a second SB 255 and a second entity bean (EB) 260 receiving data from the second MDB 250.

Figure 3:
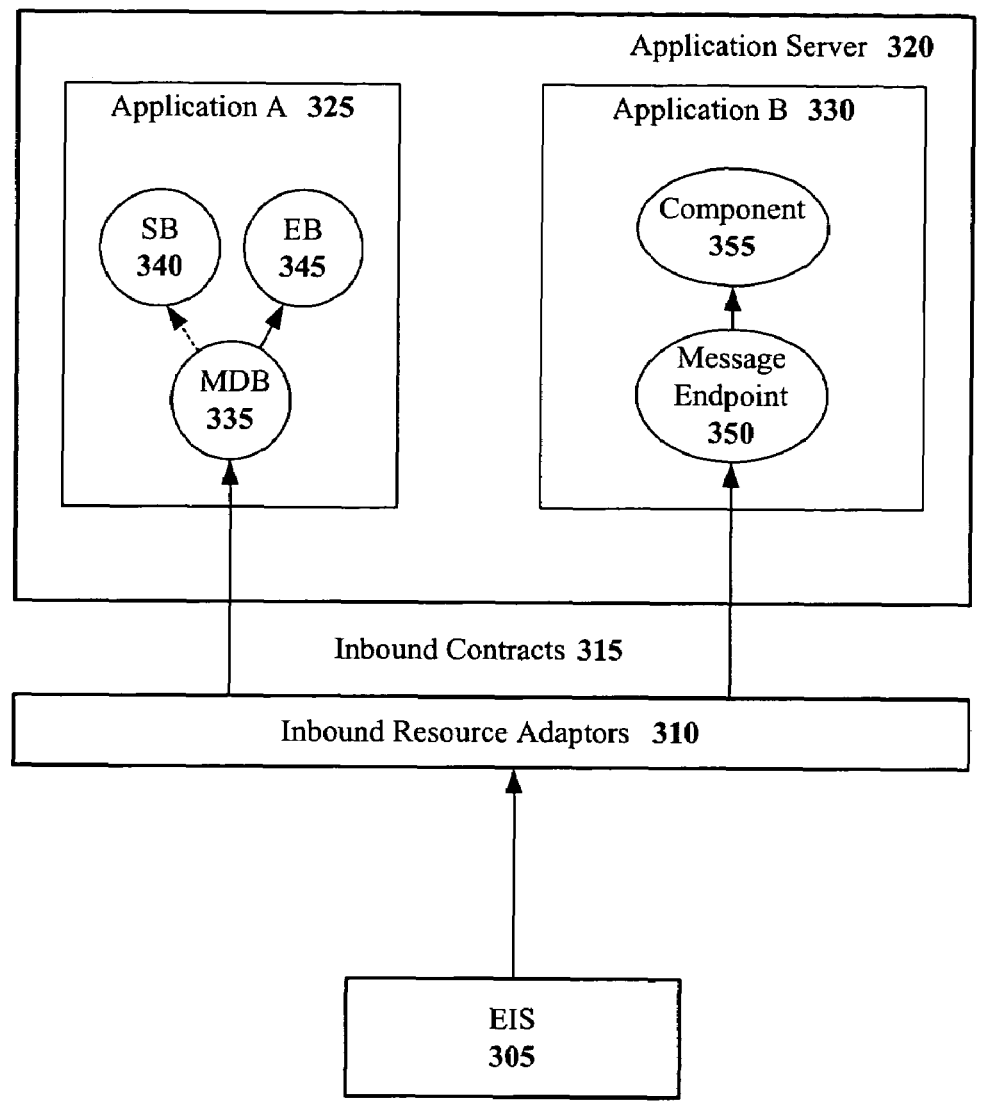
FIG. 3 is a block diagram of an embodiment of a client/server system in which arbitrary types of message endpoints may consume messages.

FIG. 3 is a block diagram of an embodiment of a client/server system in which arbitrary message endpoints may receive messages from an external source. In this illustration, an EIS 305 sends messages to a server. The messages are received by inbound resource adapters 310, at least one of which is configured for the EIS 305. However, the resource adapter may or may not provide communications to a message-driven Java bean. The inbound communications are sent pursuant to inbound contracts 315 and may be received by multiple listeners in an application server 320.

In the illustration shown in FIG. 3, the application server 320 includes a first application denoted as application A 325 and a second application denoted as application B 330. Under an embodiment of the invention, the message endpoints are not limited to message-driven Java beans. In this illustration, a first message endpoint is an MDB 335 for the application 325. However, a second message endpoint is an arbitrary type of listening device for application B 330. In this illustration the MDB 335 may transfer the received data, as shown by shown as a session bean (SB) 340 and an entity bean (EB) 345 receiving data from the MDB 335, and transferring the data on as needed. The second message endpoint 350 is shown transferring the data to another program component 355, which may process or utilize the received messages as needed for the application.

Under an embodiment of the invention, the message subscription illustrated in the FIG. 3 is established by a versatile activation interface that allows for the use of various message listeners. Under an embodiment of the invention, the message listeners are not limited to message-driven Java beans. Under an embodiment of the invention, the activation interface allows for establishment of the message subscription in a single pass operation.

Figure 4:
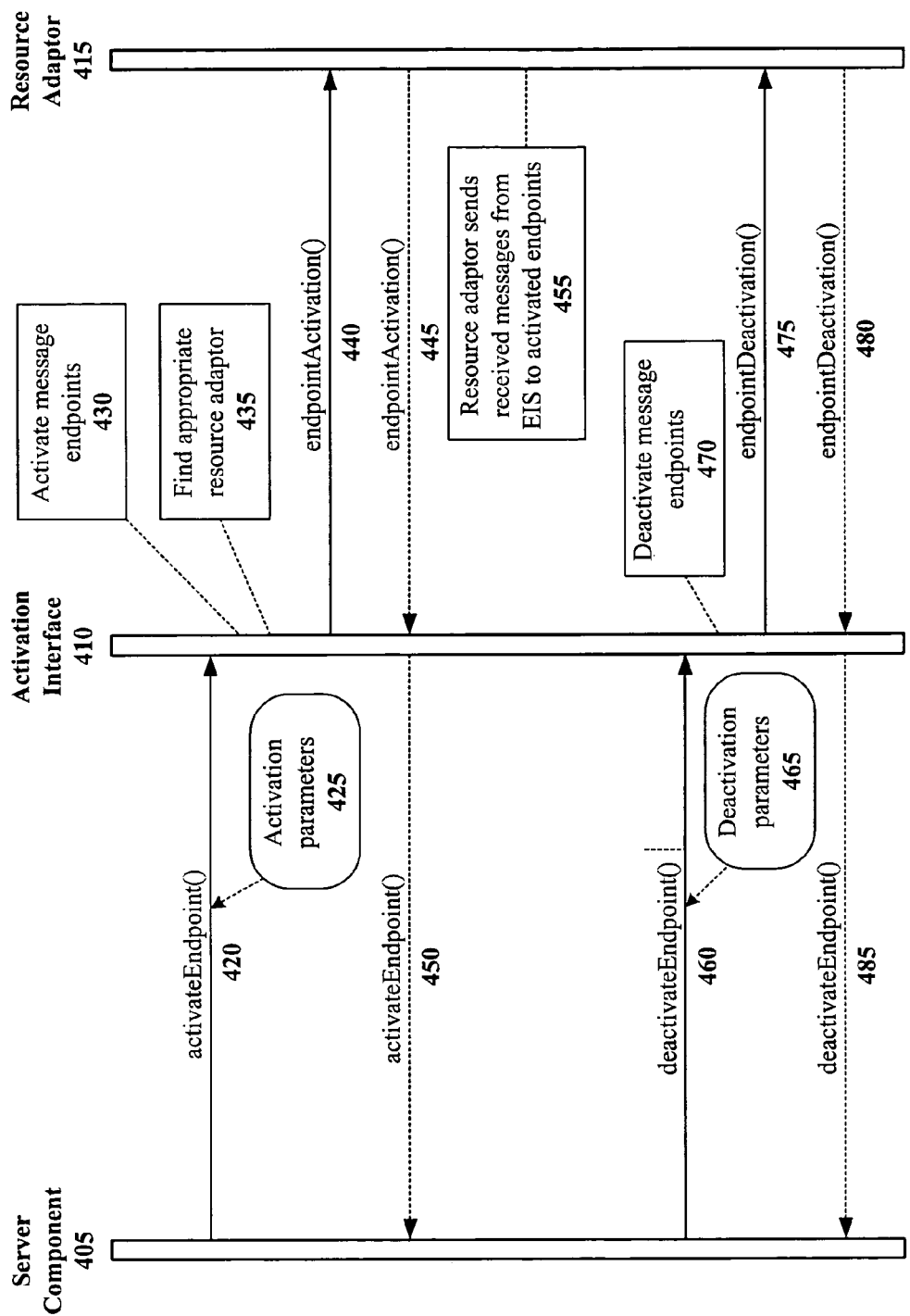
FIG. 4 illustrates commands exchanged for an embodiment of the invention.

FIG. 4 illustrating an embodiment of the establishment of message endpoint activation in the form of a sequence diagram. In this illustration, a server component allows establishment of a message subscription in one pass. Under an embodiment of the invention, a server component can utilize an activation interface to register itself as a consumer of messages from an external source. In an embodiment, a message subscription is established without the requirement of running a compatible container for message-driven Java beans. In FIG. 4, the program objects illustrated are a server component 405, an activation interface 410, and a resource adapter 415.

According to an embodiment of the invention, the server component 405 calls the activateEndpoint( ) method 420 of the activation interface 410. According to this embodiment, the parameters passed may include the name of the resource adapter to be chosen; an appropriate message endpoint factory instance to allow simple creation of the needed message endpoints; the activation properties; and the message listener type. Upon activateEndpoint( ) method call 420, the activation interface provides for activation of the needed message endpoints 430 and finds the appropriate resource adapter for the message subscription 435, the identified adapter being resource adapter 415. The activation interface 410 dispatches an activation call, endpointActivation( ) 440, to the appropriate resource adapter 415.

Upon activation, the control is returned 445 from the resource adapter and then by activateEndpoint( ) return 450 the activation of the message subscription is completed. While the message subscription is active, the resource adapter forwards any received messages from the sender, and the messages are consumed by the active message endpoints 455.

Under an embodiment of the invention, specific deactivation of message endpoints may also be implemented. As illustrated in FIG. 4, at the conclusion of the message listening subscription, the server component 405 sends a deactivateEndpoint( ) request to the activation interface 410. Under an embodiment of the invention, the deactivation parameters 465 are the same as the activation parameters and identify the name of the resource adapter in operation and the type of message endpoints utilized in the message subscription. The message endpoints are deactivated 470 and a deactivation call is made to the resource adapter 475. The endpointDeactivation( ) return 480 and the deactivateEndpoint( ) return 485 confirm the completion of the message subscription deactivation.

Under an embodiment of the invention, a message endpoint activation interface in a J2EE environment may be as illustrated in Table 1:

TABLE 1

EndpointActivation.java
package com.sap.engine.interfaces.endpoint;
import javax.resource.spi.endpoint.MessageEndpointFactory;
import javax.resource.ResourceException;

TABLE 1-continued import java.util.Properties;
public interface Endpoint Activation {
    public void activateEndpoint(
        String messageListenerName, MessageEndpointFactory
        endpointFactory,
        Properties activationProperties, String messageType)
            throws ResourceException;
    public void deactivateEndpoint(
        String messageListenerName, MessageEndpointFactory
        endpointFactory,
        Properties activationProperties, String messageType)
            throws ResourceException;
    public String[ ] getAllMessageListenerNames( );
    public String[ ] getSupportedMessageTypes(String raJNDIName);
}

In the embodiment of the invention illustrated in Table 1, a message subscription activation request (activateEndpoint) provides a message listener name; an instance of a message endpoint factory for the purpose of creating message endpoints; activation properties; and the message type to identify the message listener required. A message subscription deactivation request contains the same parameters. Under an embodiment of the invention, the use of the activation interface requires a component to provide a subscription request with sufficient parameters to allow establishment of a message subscription in one sequence of operations.

In addition, the interface reflects methods to identify all active resource adapters (getAllMessageListenerNames) and to identify the message types that are supported by each resource adapter (getSupportedMessageTypes). Such methods may be utilized in connection with establishment of a message subscription to identify what resource adapters are active and to determine whether a resource adapter is compatible with a message type for a server component.

Figure 5:
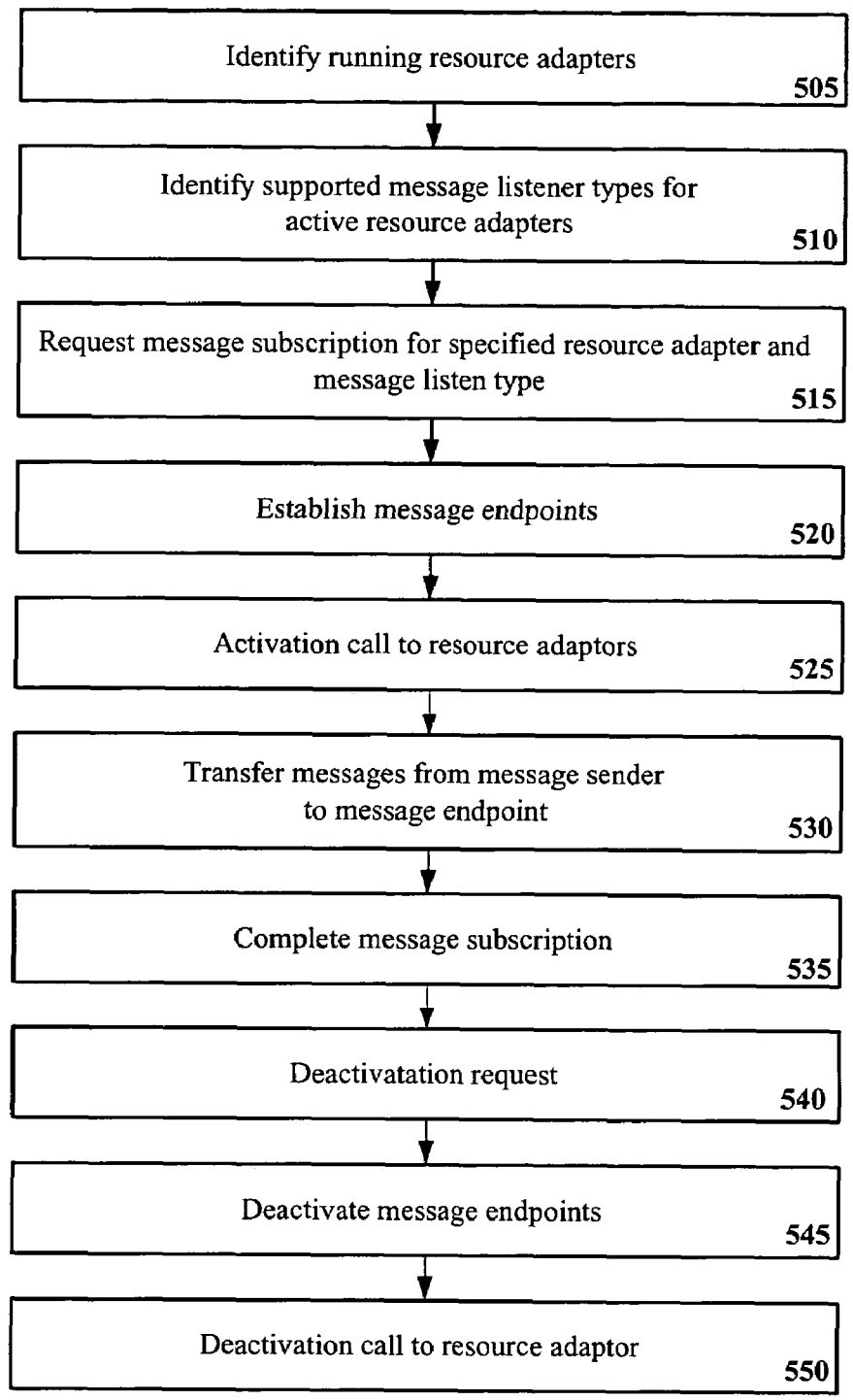
FIG. 5 is a flowchart illustrating an embodiment of message endpoint activation.

FIG. 5 is a flow chart illustrating an embodiment of endpoint activation for a message subscription. In this illustration, a first method provides for identifying all running resource adapters 505. The knowledge of all running resource adapters allows a request for use of an existing adapter if this is possible. A second method provides for identification of supported message listener types for any resource adapter 510. This method allows a request for a specific message listener type that may be utilized with a server component. The first and second methods provide additional freedom for a server component to determine the best combination of available resource adapters and message listener types. Among other advantages, this process may assist a server component if a server component can work with several different message types.

A message subscription request is then made, with the request specifying the resource adapter and message listener type 515. The request includes provision of a message endpoint factory instance to create the needed message endpoint. One or more message endpoints are established 520 and an activation call is made to the resource adapter 525. Upon activation of the message subscription, messages from the relevant message sender (e.g., an EIS) are transferred from the resource adapter and are consumed by the activated message endpoint 530.

Upon completion of the message subscription 535, a deactivation request is made 540 and the message endpoints are deactivated 545. Under an embodiment of the invention, the deactivation request designates the message listener type and the name of the resource adapter, which allows more flexibility in tearing down resources if the resources are no longer needed. The resource adapter then receives a deactivation call 550.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the invention. Software may include a computer-readable medium having stored thereon data representing sequences of instructions that, when executed by a processor, cause the processor to perform certain operations.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   identifying all active resource adapters for a server in response to a request, the active resource adapters including a first active resource adapter;
   identifying all message listener types that are supported by the first active resource adapter in response to a request, the supported message listener types including a first message listener type;
   receiving a request from a server component for a message subscription to provide messages from a message provider to the server component, the message subscription request having parameters including identification of the first active resource adapter and the first message listener type;
   establishing the message subscription, the message subscription utilizing the first active resource adapter and a message listener component of the first message listener type; and
   transferring messages from the message provider to the message listener component utilizing the first active resource adapter.

2. The method of claim 1, wherein operation of the server is compatible with the Java 2 platform enterprise edition (J2EE) connector architecture specification.

3. The method of claim 1, wherein the message listener component does not comprise a message-driven Java bean.

4. The method of claim 1, wherein the message listener component is a message endpoint to asynchronously receive messages.

5. The method of claim 1, wherein the message provider comprises an enterprise information system (EIS).

6. The method of claim 1, wherein the subscription request further comprises an instance of a message endpoint factory, the message endpoint factory to generate message listener components compatible with the first message listener type.

7. The method of claim 6, further comprising creating the message listener component utilizing the instance of the message endpoint factory.

8. The method of claim 1, wherein the message subscription is established with the first active resource adapter in a single pass based on the parameters of the request for a message subscription, the activation request passing sufficient parameters to allow establishment of the subscription without further data.

9. The method of claim 1, further comprising deactivating the message listener component in response to a deactivation request from the server component.

10. The method of claim 9, wherein the deactivation request includes identification of the first active resource adapter and the first message listener type.

11. A server comprising:
    a processor to process data for the server;
    a storage for computer applications;
    a server component, the server component to request identification of all running resource adapters provided by the processor of the server, including a first resource adapter, and all message listener types supported by the first resource adapter, including a first message listener type, the server component further to request a subscription to receive messages from a message provider, the subscription request identifying the first resource adapter and the first message listener type; and
    an activation interface, the activation interface to receive the request from the server component, the activation interface to send an activation call to the first resource adapter;
    the resource adapter to transfer messages from the message provider to a message listener component of the first message listener type.

12. The server of claim 11, wherein the server is compatible with the Java 2 platform enterprise edition (J2EE) connector architecture specification.

13. The server of claim 11, wherein the message listener component does not comprise a message-driven Java bean.

14. The server of claim 11, wherein the message listener component comprises a message endpoint.

15. The server of claim 14, wherein the message listener component asynchronously receives messages from the message provider.

16. The server of claim 14, wherein the subscription request further includes an instance of a message endpoint factory to create message endpoints of the desired message type.

17. The server of claim 16, wherein the server is to create the message listener component utilizing the instance of the message endpoint factory.

18. The server of claim 11, wherein the message provider comprises an enterprise information system (EIS).

19. A server comprising:
    means for processing data for the server, the data including messages for applications;
    means for storing computer applications;
    means for identifying all active resource adapters for the server;
    means for identifying all message types supported by a first active resource adapter; and
    means for establishment of a message subscription between a server component and a message provider in response to a request from the server component, the request identifying the first active resource adapter and a first message type supported by the first active resource adapter, wherein the means includes establishment of a message endpoint of the first message type that does not comprise a message-driven Java bean.

20. The server of claim 19, wherein the server is compatible with the Java 2 platform enterprise edition (J2EE) connector architecture specification.

21. The server of claim 19 wherein the message endpoint asynchronously receives messages from the message provider.

22. The server of claim 19, wherein the means for establishment of a message subscription includes means for creating message endpoints of the first message type.

23. The server of claim 19, wherein the message provider comprises an enterprise information system (EIS).

24. A computer-readable medium having stored thereon data representing sequences of instructions that, when executed by a processor, cause the processor to perform operations comprising:
   responding to a first method requesting identification of all active resource adapters for a server, the active resource adapters including a first active resource adapter;
   responding to a second method requesting all message listener types that are supported by the first active resource adapter, the supported message listener types including a first message listener type;
   receiving a request from a server component for a message subscription to provide messages from a message provider to the server component, the message subscription request having parameters including identification of the first active resource adapter and the first message listener type;
   responding to a request to receive messages from a message provider, the request including the first active resource adapter and the first message listener type; and
   transferring messages from the message provider to a message listener component for the server utilizing the active resource adapter, the message listener component being of the first message listener type.

25. The medium of claim 24, wherein operation of the server is compatible with the Java 2 platform enterprise edition (J2EE) connector architecture specification.

26. The medium of claim 24, wherein the message listener component does not comprise a message-driven Java bean.

27. The medium of claim 24, wherein the message listener component is a message endpoint to asynchronously receive messages.

28. The medium of claim 24, wherein the message provider comprises an enterprise information system (EIS).

29. The medium of claim 24, wherein the request to receive messages further comprises an instance of a message endpoint factory, the message endpoint factory to generate message listener components compatible with the first message listener type.

30. The medium of claim 29, further comprising instructions that, when executed by the processor, cause the processor to perform operations comprising:
   creating a message listener component utilizing the instance of the message endpoint factory.

31. The medium of claim 24, wherein the message subscription is established with the first active resource adapter in a single pass based on the parameters of the request for a message subscription, the activation request passing sufficient parameters to allow establishment of the subscription without further data.

32. The medium of claim 24, further comprising instructions that, when executed by the processor, cause the processor to perform operations comprising:
   deactivating the message listener component in response to a deactivation request.

33. The medium of claim 32, wherein the deactivation request includes identification of the first active resource adapter and the first message listener type.

* * * * *